Figure 1:
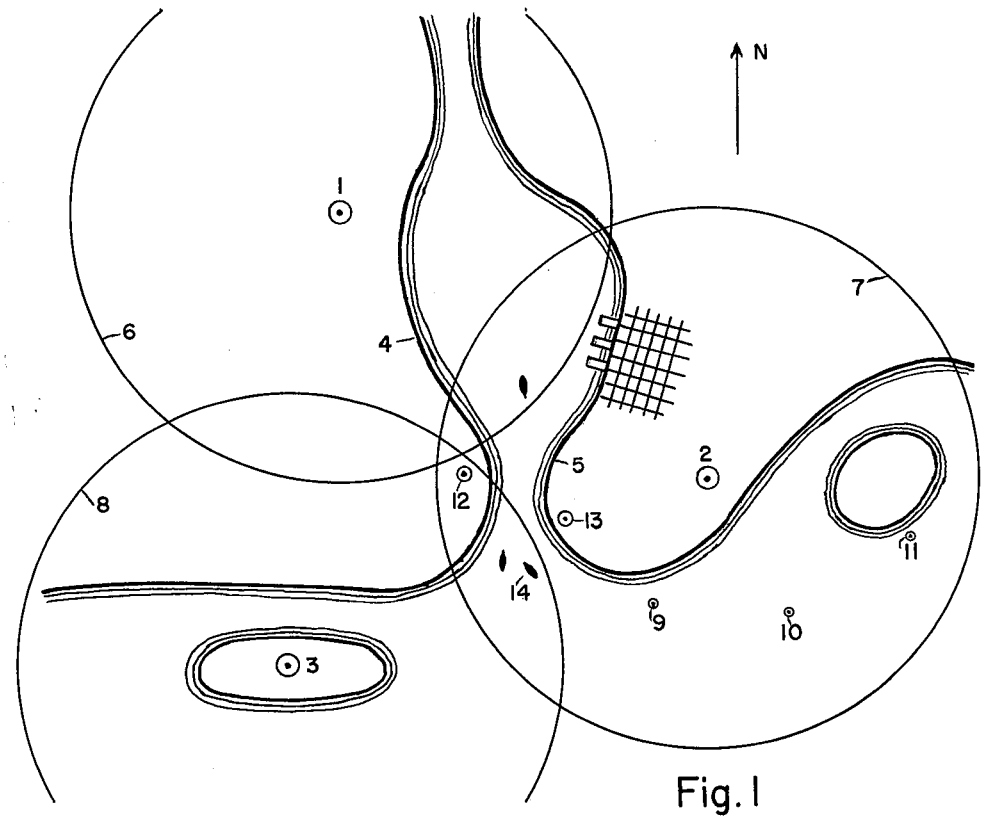

Nov. 5, 1963　　　　　E. L. CHAFFEE　　　　　3,110,023
RADAR SYSTEM FOR INDICATING POSITION AND COURSE OF
A MOVING OBJECT RELATIVE TO A STATIONARY
OBSERVATION POINT
Filed May 8, 1957　　　　　　　　　　　　　2 Sheets-Sheet 1

*INVENTOR.*
EMORY LEON CHAFFEE
BY
ATTORNEY

Nov. 5, 1963 E. L. CHAFFEE 3,110,023
RADAR SYSTEM FOR INDICATING POSITION AND COURSE OF
A MOVING OBJECT RELATIVE TO A STATIONARY
OBSERVATION POINT
Filed May 8, 1957 2 Sheets-Sheet 2

*INVENTOR.*
EMORY LEON CHAFFEE
BY
ATTORNEY

United States Patent Office 3,110,023
Patented Nov. 5, 1963

3,110,023
RADAR SYSTEM FOR INDICATING POSITION AND COURSE OF A MOVING OBJECT RELATIVE TO A STATIONARY OBSERVATION POINT
Emory Leon Chaffee, Belmont, Mass., assignor to John Hays Hammond, Jr.
Filed May 8, 1957, Ser. No. 657,804
2 Claims. (Cl. 343—6)

This invention relates to a navigational guide system and more particularly to a system for displaying to a pilot of a moving vehicle its position and course with reference to the positions and courses of other objects.

The invention, if specifically applied to a navigable waterway such as a harbor, river, or lake, relays to the navigator of a vessel a radar map of the territory surrounding a stationary land viewing station, showing on the map the position of the vessel and all other nearby vessels and buoys. In addition to showing the instantaneous positions of the vessel and of other moving objects, it also shows all previous positions of the vessel and of other moving objects thereby displaying their courses. The radar map and courses of objects may be displayed as seen from any one of a number of stationary viewing stations selected at will by the pilot.

While the invention has been briefly described as applied to navigation in a waterway, it may be applied to airplane navigation where each pilot of a plane is shown his course and the courses of all other nearby planes as seen from the airport.

The invention may also be used to disclose to pilots of ships in a fleet or convoy the positions of all ships as seen from the flagship or guide ship.

One feature of the invention is that it shows to the pilot of a moving vehicle his entire course and position as seen from a stationary point or from a particular observation point.

Another feature of the invention is that the system as a navigational aid operates at times of low visibility such as in fog or at night.

A further purpose of the invention is that high grade radar service is provided on vessels or planes by the use of simple, light, and inexpensive equipment on the navigating vehicle, while the expensive and complex radar apparatus is located in one or more central viewing stations where trained personnel can operate the equipment at its highest efficiency and effectiveness.

A brief description of the invention as applied to navigation in and out of a land-bound harbor is given. Two or more primary radar stations are installed on land, each station having a high resolution radar system with a range of say four miles. The stations are located so that the circular range areas covered by the several stations include the navigable waterways with some overlap between pairs of areas.

The radar antennas of all stations rotate in synchronism and in phase so that all point north at the same instant. The radar carrier frequency is different for the several stations to prevent interference one with another.

Each station is provided with a plan position indicator (PPI) type radar including a primary indicator tube, in which the high frequency radial scanning rotates in synchronism with the rotation of the antenna. As is well known the echo pulse from a distant object produces a bright spot along the radial scan corresponding to the bearing to the object at a distance from the center of the screen which is proportional to the distance to the object.

The patterns of bright spots along successive radial scan lines of the primary tube are repeated as superimposed patterns in a single direction of scan on the screen of a second cathode-ray tube. These patterns of the second tube are imaged on the receiving screen of a television pick-up tube such as a vidicon tube. This image is scanned at a low rate of say 300 scans per second and the image pattern, transcribed into electrical pulses, is recorded on a moving magnetic tape or wire or on any other suitable memory device. The signals taken from the tape or memory device are transmitted to the navigating vessel by amplitude modulation of a relatively low frequency radio carrier wave.

The received radio signal on the navigating vessel modulates the cathode-ray beam of an indicator tube while its electron beam scans radially in synchronism with the linear scanning of the vidicon tube. The light patterns along the radial scans of the primary tube are therefore reproduced along the radial scans of the indicator tube on the vessel. The rotation of the radial scan of the latter tube is synchronized with the rotation of the radial scans of the primary tube. Thus the total image on the primary indicator tube is copied or relayed to the indicator tube on the vessel, but, because of the memory device, all previous positions of the moving objects recorded on the tape are also shown on the indicator tube on the vessel.

The pilot on the vessel sees on the screen of his indicator tube the course of his vessel, and the courses of all other vessels as they appear on a map of the area as seen from the particular viewing station to which his radio receiver is tuned. By switching to another carrier wave he sees the map and courses as viewed from another radar viewing station.

The invention also consists in certain new and original features of construction and combinations of parts hereinafter set forth and claimed.

Figure 4:
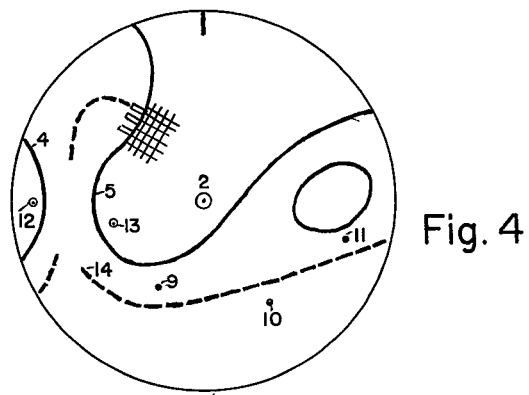
Figure 2:
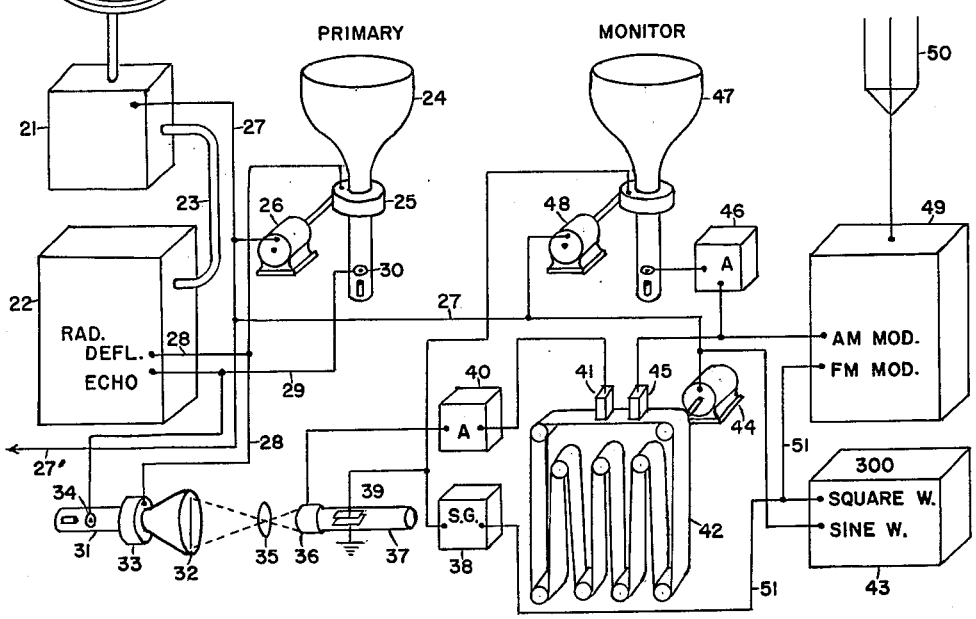
Figure 3:
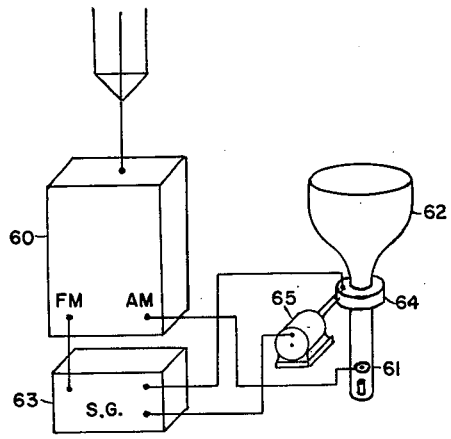

The nature of the invention as to its objects and advantages, the mode of its operation and the manner of its organization, may be better understood by referring to the following description, taken in connection with the accompanying drawing forming a part thereof, in which FIG. 1 shows a map of a harbor and the positions and range areas of three radar viewing stations, FIG. 2 is a schematic diagram of the equipment and connections at one of the viewing stations, FIG. 3 is a schematic diagram of the equipment in a moving ship, FIG. 4 illustrates the type of image on the indicator tube in the moving ship when tuned to one of the viewing stations.

Like reference characters denote like parts in the several figures of the drawing.

In the following description parts will be identified by specific names for convenience, but they are intended to be generic in their application to similar parts.

Referring to FIG. 1, circles 1, 2, and 3 represent three primary radar stations covering the costal waters and a harbor bounded by shore lines 4 and 5. The areas covered by the three stations are indicated by the three large circles, 6, 7, and 8 assumed, for example, to have radii of four miles. Buoys 9, 10, and 11 may indicate the ship channel, and light houses 12 and 13 may, for example, indicate the two shores of the narrows. A ship 14 represents one of a number of vessels navigating the waterway. The map of FIG. 1 and the placement of stations, buoys, lighthouses, etc. are assumed only for illustration and in no way limits the application of the invention.

FIGURE 2 indicates in schematic form the essential pieces of equipment and their interconnections which are located in each of the primary radar stations 1, 2, and 3. The radar antenna 20 is rotated, say, six times a minute by a motor in block 21. The radar stransmitter, contained in block 22, sends microwave pulses at the rate, say, of 1800 per second through wave guide 23 to antenna 20. The radar frequency is selected to give high resolution.

The primary indicator tube 24 of the radar set is represented as giving a plan-position type (PPI) presentation, though any other type of radar presentation may be used. Indicator tube 24 is provided with a radial deflection yoke 25, which for the PPI type is rotated in synchronism with the rotation of antenna 20, to provide rotating radial scans of the electron beam. This rotation of the radial scans is effected by motor 26 or by any other suitable means, operated by alternating current power over line 27 which also feeds the means in block 21 for rotating antenna 20. The 1800-cycle wave, to cause the radial scans in tube 24, is generated in the receiver in block 22 and fed to deflector yoke 25 over line 28.

The echo pulses received by antenna 20 are rectified by a radar receiver contained in block 22. The resulting pulses, indicating echoes, are fed over line 29 to the modulating grid 30 of indicator tube 24. The equipment of FIG. 2 described up to this point is conventional and may vary in details of design without affecting the method of operation or the scope of this invention.

The electron beam of a second cathode-ray tube 31 is deflected along a single line on the screen 32 by deflecting means 33 actuated by the same linear saw-tooth wave fed over line 28 which causes the radial deflection of the electron beam in indicator tube 24. The electron beam of tube 31 is also modulated by the echo pulses fed over line 29 to modulating grid 34. Hence the light pattern of the image on screen 32 is the same as the light pattern along successive radial scan lines of indicator tube 24, but the scan line in tube 31 remains fixed in position instead of rotating as in indicator tube 24.

The light pattern on screen 32 of tube 31 is imaged by lens 35 onto the receiving screen 36 of pick-up tube 37. Tube 37 may be a vidicon tube or any other suitable television camera tube. The screen 36 is scanned in the long dimension of the light pattern by a linear saw-tooth wave fed from sweep generator 38 to deflecting means 39 in the pick-up tube 37. The frequency of this scanning wave from generator 38 is a low frequency of, say, three hundred cycles per second. Hence, for the example used for illustration, there are six scans in tube 31 to every single scan of the electrical image of the light pattern on screen 36 of tube 37. Each scan of screen 36 takes place while the radial scan in indicator tube 24 moves 0.12 of a degree.

The electrical pulses from screen 36 of pick-up tube 37 are amplified in amplifier 40, and then recorded by the recording head 41 situated close to endless magnetic tape 42 travelling at a suitable velocity. For example, if the velocity of the tape is 12.5 feet per second, the record of each scan of screen 36 occupies a length of one half inch on tape 42. That same half inch of record on the tape will again come under the recording head when the radial scan of tube 24 and the antenna 20 have again returned to the same angular positions. The pattern on the tape is then repeated with the addition of any new information such as the image of a ship which may have moved into line with the antenna at that particular angular position. The tape, therefore, bears and retains the records of all 10×300 or 3000 scans of screen 36 while the antenna 20 makes one revolution and hence bears the record of the light pattern on the screen of indicator tube 24 for every 0.12 degree for the entire circular radar pattern, until erased at will by a magnet held momentarily against tape 42 as it rotates.

The rotation of tape 42 is accurately synchronized with the rotation of antenna 20. This may be accomplished by driving the tape, the antenna, and yoke 25 by means of the same motor, or by separate selsyn or synchronous motors driven by the same alternating power supply from block 43. As indicated in FIG. 2, motor 26 driving the yoke 25 and motor 44 driving the tape 42 are operated from the same line 27 receiving power from the 300-cycle generator in block 43.

The record on tape 42 is picked off by reproducing head 45 and the resulting electric waveform is increased in strength by amplifier 46. The resulting signal modulates the electron beam in a monitor indicator tube 47, which is similar to indicator tube 24. The electron beam in monitor tube 47 is deflected in linear radial scans by the same saw-tooth waveform from sweep generator 38 which deflected the electron beam in pick-up tube 37. The radial scan in tube 47 is rotated in synchronism with the radial scan of tube 24 by motor 48 operated from alternating-current line 27. The instantaneous angle of the rotating scans of tube 47 with respect to the simultaneous angle of the radial scan of tube 24 may be advanced by the proper angle to compensate for the lag in time of the transcribed record because of the distance between the recording head 41 and the reproducing head 45.

The pattern displayed on the screen of monitor tube 47 is the same as the pattern on the screen of indicator tube 24 except that all previous positions of moving objects are also recorded on the screen of monitor tube 47, thus delineating the courses of all moving objects superimposed on the map of the region from the time of the last erasure of the records on tape 42. The erasures may be at the discretion of the operator of the station or automatically periodic.

While a magnetic tape has been described as the recording memory device, any other suitable memory means may be used and be within the scope of the invention.

The electrical waveform from the reproducing head 45 is also fed to a radio transmitter in block 49 where it amplitude modulates a radio wave of a suitable frequency such, for example, as forty five megacycles. This radio transmitter radiates the modulated radio wave by antenna 50. The radio wave is received by any ship in the vicinity to reproduce the pattern displayed on the screen of monitor tube 47.

The timing of the sweep voltage for the linear scanning in tube 37 and for the radial scanning in monitor tube 47 is determined by a 300-cycle square-wave voltage produced in block 43. This square wave is differentiated in block 38 and the sharp positive spike at the beginning of each cycle thus produced triggers a blocking-oscillator sweep generator or the equivalent in block 38.

The timing of the events in the ships receiver is effected by transmitting to the ship by frequency modulation or other means the 300 cycle square wave fed to transmitter 49 over line 51.

FIGURE 3 shows in schematic form the equipment located in a ship or other moving vehicle. A radio receiver located in block 60 can be tuned to the radio transmission from any one of the primary radar stations 1, 2, 3, etc. The signal derived from the amplitude modulation of the radio wave is fed to the modulating grid 61 of indicator tube 62 and reproduces the pattern of bright spots which appear on the screen of monitor tube 47.

The 300-cycle square wave derived from the frequency modulation of the radio carrier wave synchronizes a 300-cycle oscillator in block 63. The 300-cycle alternating current from this oscillator rotates the radial deflection yoke by means of motor 65 or other suitable drive so that the yoke rotates in synchronism with the antenna 20 of the radar station.

The radial scanning deflection of the electron beam of indicator tube 62 is caused by a saw-tooth wave produced by a blocking oscillator in block 63 which is triggered by the spikeshaped pulses obtained by differentiating in block 63 the square wave received by frequency modulation. By these means the radial deflections in tube 62 are initiated at the same instant the radial deflections of monitor tube 47 start, and are held in strict synchronism with them.

Any other suitable means may be used to obtain accurate synchronization of the radial scans without departing from the invention.

The operations explained above produce on the screen of indicator tube 62 in any ship a copy of the pattern which is displayed on the screen of monitor tube 47. The angular position of the pattern on the screen of tube 62 may be anything according to the phasing of the motors 48 and 65. An indication of the true north position on the display on tube 62 identifies the orientation of the display. This true north direction is indicated by a bright spot at the end of the radial scan corresponding to true north as displayed on the screens of tube 47 and tube 62. This bright spot is produced by the primary radar pulse sent out by the transmitter in block 22, delayed by a time corresponding to an echo from an object four miles distant, and fed into the receiver in block 22 when the antenna points north. This produces bright spots at the end of scan lines on the screen of tube 32 when antenna 20 points north. These bright spots on screen 32 are then relayed to the monitor tube 47 and all indicator tubes in moving vehicles such as tube 62.

In order that the true-north indication will be in the same position on the screen of tube 62 whatever the radar station to which the receiver 60 is tuned, the radar antennas of all primary radar stations 1, 2, 3, etc. point north at the same instant. This may be accomplished by synchronizing in phase and frequency the antennas of all stations by 300-cycle power sent over land lines as fed from line 27' in FIG. 2, or by radio transmission of the phasing pulses corresponding to true north direction just described, or by any other suitable means. Under these circumstances the display on the screen of indicator tube 62 will be oriented in the same position when tuned to any one of the radar stations.

FIGURE 4 shows the type of display exhibited by tube 62 when the radio receiver 60 is tuned to viewing station 2. The map of the surrounding area remains fixed and all light houses, buoys, and stationary vessels also remain fixed in position. The courses of moving ships are shown, for example, by the three courses indicated by dashed lines. The course of ship 14 is shown entering the narrows after having passed by the three buoys.

The invention has been described in the form which relays the instantaneous positions of all objects, and also previous positions of moving objects provided by the accumulated information in the memory device. The invention can also be applied without using the memory device, designated by numbers 41, 42, 44, and 45, in which case only the instantaneous positions of objects as indicated on the screen of tube 24 are relayed to the ships stations. In such a case the lines to recording head 41 and the line to reproducing head 45 are detached therefrom and connected together, and motor 44 is disconnected from line 27. No change is made in the equipment in FIG. 3.

Although only a few of the various forms in which this invention may be embodied have been shown herein, it is to be understood that the invention is not limited to any specific construction but may be embodied in various forms without departing from the spirit of the invention.

What is claimed is:

1. A system for indicating position and course of a moving object relative to a stationary observation point comprising a radar transmitter and receiver located at said observation point having a rotating radiator adapted to sweep the surrounding area at a predetermined sweep frequency and adapted to radiate radar pulses at a second predetermined pulse frequency and to receive echo pulses whose time delays are proportional to the ranges of objects in said area, said receiver having a first cathode-ray tube having an electron beam and a screen, means deflecting said electron beam linearly to scan said screen repeatedly at said pulse frequency and means enhancing said electron beam by said echo pulses to produce light spots on said screen timed and spaced in a manner to reveal the bearings and ranges respectively to said objects, a pick-up tube positioned to receive images of light spots on said cathode-ray tube screen, means including an electron beam for scanning said image on said pick-up tube linearly at a predetermined frequency lower than said pulse frequency, to produce electrical impulses from said pickup tube whose timing is related to the bearing and ranges of said objects, a transmitter at said observation point adapted to transmit a radio carrier wave, means modulating said radio carrier wave by said impulses and by signals at said lower predetermined scanning frequency, a second cathode-ray tube located on one of said objects, a receiver on said object adapted to receive and demodulate said radio carrier wave to derive therefrom said impulses and said lower scanning frequency signals, means causing radial scans of the electron beam of said second cathode-ray tube which are timed in synchronism with said lower predetermined scanning frequency signals, means modulating said electron beam by said impulses to produce spots on said radial scan indicating ranges to said objects, means rotating said radial scans of said second cathode-ray tube, means at said observation point to produce pulses synchronized with the rotation of said radiator and to transmit said last pulses to said receiver, and means in said receiver responsive to said last pulses to produce indications on the screen of said second cathode-ray tube giving ranges and bearings of said objects with respect to said observation point, recording means for recording the light spots on said first pick-up tube during successive radiator sweeps and having means to reproduce a succession of such spots whereby signals representing such succession of spots are transmitted to said second cathode ray tube for reproducing thereon a series of spots representing the course of said object.

2. A system as set forth in claim 1 in which said recording means comprises a magnetic tape driven in synchronism with the rotation of said radiator.

References Cited in the file of this patent

UNITED STATES PATENTS

| | | |
|---|---|---|
| 2,412,670 | Epstein | Dec. 17, 1946 |
| 2,422,295 | Eaton | June 17, 1947 |
| 2,500,633 | Edwards | Mar. 14, 1950 |
| 2,519,935 | Smith et al. | Aug. 22, 1950 |
| 2,534,610 | Marcy | Dec. 19, 1950 |
| 2,552,172 | Hawes | May 8, 1951 |
| 2,668,286 | White | Feb. 2, 1954 |
| 2,698,931 | Voorhis | Jan. 4, 1955 |
| 2,795,780 | Gross | June 11, 1957 |
| 2,842,759 | Kenyon | July 8, 1958 |

FOREIGN PATENTS

| | | |
|---|---|---|
| 607,620 | Great Britain | Sept. 2, 1948 |